Dec. 21, 1948.   W. A. TOLSON   2,456,801
OPTICAL HEAT DETECTION SYSTEM
Filed Feb. 14, 1944   2 Sheets-Sheet 1

Fig. 1.

Fig. 2.

Inventor
WILLIAM A. TOLSON
By
Attorney

Dec. 21, 1948. W. A. TOLSON 2,456,801
OPTICAL HEAT DETECTION SYSTEM
Filed Feb. 14, 1944 2 Sheets-Sheet 2

Inventor
WILLIAM A. TOLSON
By
Attorney

Patented Dec. 21, 1948

2,456,801

UNITED STATES PATENT OFFICE 2,456,801

OPTICAL HEAT DETECTION SYSTEM

William A. Tolson, Princeton, N. J., assignor to Radio Corporation of America, a corporation of Delaware Application February 14, 1944, Serial No. 522,346

7 Claims. (Cl. 250—83)

The present invention relates to the detection of radiant energy and more particularly to the optical production of a visible image of a heat image.

In systems heretofore proposed for translating heat images into visible images, diaphragms have been employed which are responsive to pressure-operated heat-sensitive cells and the motions of the diaphragms then transformed into electrical potentials forming an approximation of the image sought. Such electrical systems in addition to being complicated do not efficiently transform the motions.

Some of the objects of the present invention are; to provide an improved system for visibly producing the image of a heat image; to provide a system for optically producing the image of a heat image; to provide a system for optically multiplying the motion of a diaphragm as influenced by a single heat sensitive cell; to provide a system for optically multiplying the motion of a diaphragm as influenced by a plurality of heat-sensitive cells; to provide a novel method of setting up an optical multiplying system so that the apertured screens employed have the same geometrical configurations respectively as the heat-sensitive cells; to provide an optical system which will increase the effective response from a pressure-actuated heat-responsive cell; and to provide other improvements as will hereinafter appear.

Figure 3:
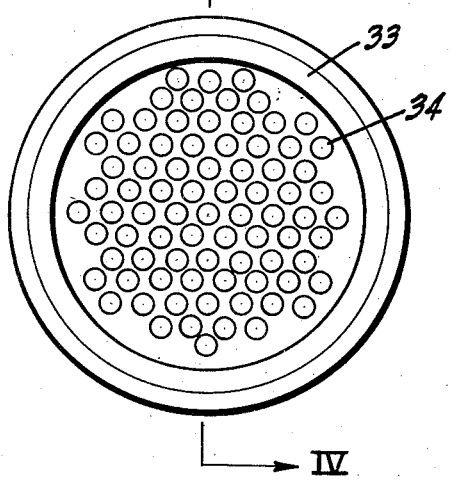
Figure 4:
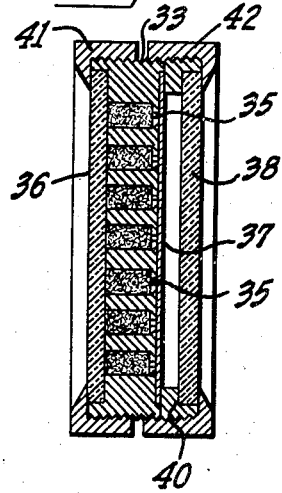
Figure 5:
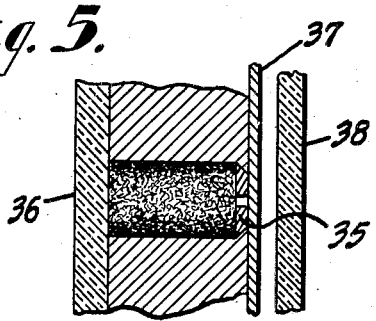
Figure 7:
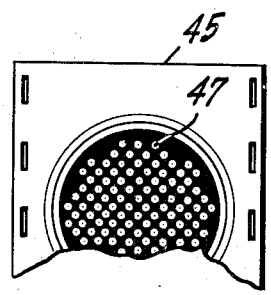
Figure 6:
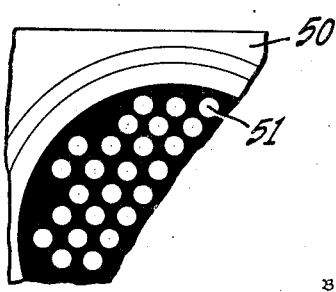

In the accompanying drawings, Fig. 1 represents diagrammatically a system embodying one form of the present invention; Fig. 2 represents diagrammatically a system embodying a modified form of the invention; Fig. 3 represents an elevation of one form of multi-cell unit employed in the system of Fig. 2; Fig. 4 represents a section on line IV—IV of Fig. 3; Fig. 5 represents an enlarged section of one of the cells of Fig. 3; Fig. 6 represents an elevation of the larger of the apertured plates showing the geometrical pattern of the apertures; and Fig. 7 represents an elevation of the smaller of the apertured plates showing the geometrical pattern of the apertures.

Referring to Fig. 1 of the drawings, heat waves 10, emanating from the area under observation are received upon the concave side of a spherical mirror 11 and reflected, as indicated by arrow lines 12, to the surface of a plane reflector 13, for bringing them to a common focal point, as indicated by the arrow lines 14, at which point a heat sensitive unit 15 is located. As shown, this unit 15 comprises a cell 16 preferably of one fluff heat-responsive type having the heat-receiving side sealed by a window 17, formed of rock salt or other suitable substance capable of transmitting heat while preventing the passage of sound waves. The so-called "fluff" cell is in the form of a closed receptacle filled with a suitable carbonaceous material, such as dark colored carbonized fibres, which are extremely sensitive to radiant energy of all wave lengths, and which cause occluded air and gases to expand when radiant energy falls thereon. Thus, compressional waves are created operating as a function of the amplitude of the radiant energy and are utilized in the formation of the optical image as will hereinafter appear.

At the opposite side of the cell 16, a pressure-sensitive diaphragm 18 is located with its inner face juxtaposed to a plurality of ports 20 communicating with the interior of the cell 16. The outer face of the diaphragm 18 is coated with a highly reflective substance, such as evaporating aluminum or other suitable metal to form a mirror surface 21, the reflections from which are a function of the motion of the membranous diaphragm. The diaphragm 18 is of microscopic thinness and is preferably composed of pure nitrocellulose which is made sufficiently plastic to prevent breakage. Moreover, a moisture repellent ingredient is included to minimize the effects of humidity. By way of example, one composition, disclosed and claimed in the copending application Serial No. 515,058, filed December 20, 1943 by John Evans, entitled "Heat detection devices," is as follows:

| | | |
|---|---|---|
| Pear oil | cc | 50 |
| Pure cellulose nitrate | gram | 1 |
| Formaldehyde | cc | .01 |
| Chrome alum | gram | 1 |
| Synthetic camphor (Dupont) | do | .25 |
| Glycerine | cc | .01 |

The ingredients are dissolved in the above sequence. One method of forming the diaphragm is to deposit the ring or frame, on which the diaphragm is to be formed, at the bottom of a container. The frame is completely covered with distilled water upon whose surface is deposited a few drops of the above described solution. A film is quickly formed on the surface of the water and after a short time the exposed surface of the film is sufficiently dry. Thereafter, the film is lowered and deposited on the frame by gradually and carefully lowering the water level. The film dries completely on the frame becoming very tight and exhibiting considerable elasticity when stretched or deformed.

While the diaphragm 18 as just described is deformable by variations in pressure caused by radiant energy received by the sensitive unit, it may itself be made responsive to heat waves and so change its contour as a function thereof. This can be accomplished by giving the diaphragm heat absorbing characteristics, such for example, as depositing thereon a suitable layer on the outer diaphragm face exposed to the heat waves, such layer being deposited by evaporation in an oxygen atmosphere of approximately 3 mm. of mercury. A suitable radiant energy absorbing layer may be formed by zinc which is alloyed with antimony so as to decrease the evaporation potential of the zinc. The oxygen atmosphere oxidizes the zinc whereby it becomes a black deposit having a high degree of absorption for heat waves extending through the entire heat spectrum and into the far infra red. The opposite side of the diaphragm has a metallic coating thereon forming the mirror surface 21, as heretofore explained. Thus, it will be seen that heat applied to the diaphragm 18 will change the outer face of the initially plane diaphragm 18 into either a spherical convex mirror or into a spherical concave mirror according as the temperature rises or falls with respect to the predetermined temperature selected as the reference position for the diaphragm. In Fig. 1 the reference position is shown with the reflecting surface 21 slightly convex. A glass window 22 is mounted in front of the diaphragm 18 but spaced therefrom and forms with the encircling side casing 23 an airtight compartment which is protected mechanically and also prevents sound waves from affecting the diaphragm.

For observation purposes, the unit 15 is mounted opposite the concave side of the mirror 11 and in register with a sight opening 24 provided in the curved mirror 11, and which opening is of such a size as to prevent any portion of the mirror from obstructing light rays reflected from the mirror face of the diaphragm 18.

In order to detect variations in the contour of the mirror diaphragm 18 due to applied heat and from which variations an image of the area under observation can be formed, a light source 25 is located in front of the sight opening 24 and angularly disposed with respect to the axis of the reflecting diaphragm 18. Between the sight opening 24 and the light source 25, is an opaque screen 26 having a relatively small aperture A, arranged to be illuminated by light rays focussed thereon by a converging lens 27, while between the aperture A and the sight opening 24, is a second lens 28 for projecting the light rays from the aperture A upon the reflector 21. This lens 28 preferably has a fairly long focal length in order to image aperture A at some point F after being reflected from the mirror diaphragm of the heat cell 16. The reflected beam of light diverging from the point F is directed upon an opaque screen 30 having an aperture A' symmetrically located with respect to the received light beam. The diameter of the aperture A' is determined by the basic formula $$\frac{A}{A'} = \frac{d}{d_1}$$

where $d$ and $d_1$ are the respective distances of A and F from the lens 28. If the aperture A' were placed at F, and the optical system was perfect, all the light at F would then pass through the aperture A'. In accordance with the present system, the screen 30 is moved along the beam of light until the area of the circle of light intercepted is equal to twice the area of the aperture. If, now, the heat applied to the responsive cell 16 is greater than the calibrated temperature, the mirror diaphragm 18 will become a spherical mirror convex toward the light source which will have the effect of moving F toward A' thereby increasing the light passing through the aperture. Conversely, if the applied heat is less than the reference temperature, then the diaphragm 18 will become a concave spherical mirror and F will move away from A' and decrease the amount of light passing through the aperture. Thus, the light passing through the aperture A' is modulated in accordance with the heat applied to the heat-sensitive cell. It is also apparent that the greater the distance from the heat-sensitive cell to F, the greater will be the overall sensitivity.

For recording or projecting the modulations of the beam at aperture A', a photo-cell 31 is mounted back of the screen 30 in the path of the beam passing through A', and is included in an electrical circuit 32 having an output to an amplifier of any suitable type from which the variations produced by the modulated beam at the aperture A' can be recorded or observed in a well-known manner.

Referring to Figs. 2 to 4, a modification of the invention is shown wherein a single cell sensitive unit is replaced by a multiplicity of cells forming a mosaic of which each cell functions in the manner described in connection with Fig. 1. As here shown, this unit consists of a disc 33 having a plurality of through holes 34, each of which has the same end chamfered to seat a closure disc 35, which may include a small aperture, while the opposite ends are sealed by a window 36 common to all and preferably formed of rock salt or other transparent material capable of transmitting heat waves while blocking sound waves. Thus, a plurality of airtight compartments are provided each of which is filled with fluff of the character heretofore described. A membranous diaphragm 37 covers the entire chamfered face of the disc 33 so that a movement of air through the small apertures of any of the closure discs 35, due to the pressure caused by the applied heat, will affect the diaphragm 37 and cause it to vary its contour in the particular area affected. In other words, each individual cell is fitted with a flexible diaphragm. The entire outer surface of the diaphragm 37 is made highly reflecting by evaporating aluminum, or other suitable metal, thereon. A glass window 38 is mounted on a spacer ring 40 in front of the diaphragm and the entire structure unified by clamping rings 41 and 42 threaded upon the disc 33.

For producing an optical image directly from the aforesaid mosaic, the stationary image of the area under observation is applied through the rock salt window 36, whereby the reflecting side of the diaphragm 37 is caused to vary in contour in accordance with the variations in the heat energy applied to the respective sensitive cells. Light rays are directed against the mirror or reflecting side of the diaphragm 37, from a source of light 43 after passing through a plano-convex lens 44, an apertured plate 45, and a double convex lens 46. The source of light 43 is located at one side of the axis of the diaphragm 37, and the light therefrom is separated into a plurality of beams angularly disposed with respect to said axis, and striking the diaphragm opposite to the respective cells. This action is accomplished by forming the plate 45 with a multiplicity of apertures 47 in the same geometrical pattern as the holes 34 of the mosaic unit, and are uniformly illuminated in the conventional manner by the condensing lens 44. The physical size of the plate 45 is a fraction of the size of the diaphragm of the mosaic unit.

After reflection from the diaphragm mirror these apertures 47 are imaged in a plane at F, and are received upon a translucent viewing screen 48 after traversing an interposed apertured plate 50. This plate 50 is also provided with a multiplicity of apertures 51 arranged in the same geometrical pattern as the cells of the mosaic but of larger size than the cells of the mosaic. As here shown, these apertures 51 are twice the size of the diaphragm cells, while the apertures 47 are one-half the size of the diaphragm cells. The arrangement of the light projecting means should be so chosen as to distance that the circles of light on the diaphragm are approximately the same dimension as the individual cells in the mosaic. The basic optical arrangement for each aperture in the plate 50 is the same as heretofore described in connection with Fig. 1. In this form of the invention, the viewing screen 48 takes the place of a multiplicity of photoelectric cells behind the apertured plate 50, and is located at such a distance from the plate 50 as to give fairly even illumination. Thus, variations in the heat energy applied to individual cells in the diaphragm 37 will correspondingly affect the amount of light passing through the individual apertures 51, and will produce on the translucent screen 48 an optical image corresponding to the heat image applied to the mosaic unit.

For obtaining accurate arrangement of the apertures in the plates 45 and 50, and eliminating geometrical defects, photo-sensitive plates or films are employed in the following manner. To form the plate 45, a photo-sensitive plate or film is positioned in the place to be occupied by the apertured plate 45, while a source of light is arranged behind the disc 33 (prior to its assembly in the unit) in position to illuminate uniformly the holes 34. These holes or cells 34 will then be imaged by the lens 46 so that when the plate or film is exposed, it will have reproduced thereon the exact positive image of the holes 34 in correct relationship and size. The mosaic of heat-sensitive cells is now completed and heat energy supplied and uniformly distributed over the entire surface, and of such intensity as to bring the focal plane F into coincidence with the position of the plate 50. A photo-sensitive plate or film is now located in the position of plate 50, exposed, and a positive printed therefrom which, like the positive for plate 45, can be used directly or as a template. By this photographic process all geometrical defects in the system will be eliminated.

It will now be apparent that a unitary optical system has been devised for detecting and visibly reproducing the image of a source of radiant energy. Thus, through means well known in the art, radiant energy is directed to the heat-sensitive unit whereby the cell 16 of Fig. 1, or the cells 34 of Figs. 2 to 4, are caused to release occluded gas to form compression waves as a function of the received radiant energy. These waves vary the contour of the reflecting mirror to thus modulate the beam of light in the optical system and reproduce by the system of Fig. 1 the variations of the heat waves or by the system of Figs. 2 to 4 an image of the heat area under observation.

Having thus described my invention, I claim:

1. In a heat detecting system, a plurality of heat-responsive cells forming a mosaic, each operating to transform heat waves into compression waves, a light-reflecting element having one face juxtaposed and directly exposed to said cells, an optical system for projecting beams of light on said element respectively opposite said cells, means actuated by the compression waves in the respective cells for varying the contour of said element according to the amplitude variations of the respective waves thereby to vary the light beams reflected from said element, and a translucent screen in the path of said light variations to produce visibly an image informative of the object from which said heat waves emanate.

2. In a heat detecting system, a plurality of heat-responsive cells forming a mosaic, each cell operating to transform heat waves into compression waves, a light-reflecting element having one face juxtaposed and directly exposed to said cells, an optical system including a plate having apertures arranged in the same geometrical pattern as said cell mosaic for projecting beams of light on said element respectively opposite said cells, said plate being so located that circles of light on said mosaic due to said apertures are approximately the same dimension as the individual cells in the mosaic, means actuated by the compression waves in the respective cells for varying the contour of said element according to the amplitude variations of the respective waves thereby to vary the light beams reflected from said element, and a translucent screen in the path of said light variations to produce visibly an image informative of the object from which said heat waves emanate.

3. In a heat detecting system, a plurality of heat-responsive cells forming a mosaic, each cell operating to transform heat waves into compression waves, a light-reflecting element having one face juxtaposed and directly exposed to said cells, an optical system including a plate having apertures arranged in the same geometrical pattern as said cell mosaic but proportionately less in size for projecting beams of light on said element respectively opposite said cells, said plate being so located that circles of light on said mosaic due to said apertures are approximately the same dimension as the individual cells in the mosaic, means actuated by the compression waves in the respective cells for varying the contour of said element according to the amplitude variations of the respective waves thereby to vary the light beams reflected from said element, and a translucent screen in the path of said light variations to produce visibly an image informative of the object from which said heat waves emanate.

4. In a heat detecting system, a plurality of heat-responsive cells forming a mosaic, each cell operating to transform heat waves into compression waves, a light-reflecting element, an optical system including a plate having apertures arranged in the same geometrical pattern as said cell mosaic for projecting beams of light on said element respectively opposite said cells, said plate being so located that circles of light on said mosaic due to said apertures are approximately the same dimension as the individual cells in the mosaic, means actuated by the compression waves in the respective cells for varying the contour of said element according to the amplitude variations of the respective waves thereby to deflect the light beams reflected from said element, a second plate having apertures respectively registering with the reflected light beams, said apertures being arranged in the same geometrical pattern as said cell mosaic, and a screen receiving the respective modulated light beams from said second plate to produce visibly an image informative of the object from which said heat waves emanate.

5. In a heat detecting system, a plurality of heat-responsive cells forming a mosaic, each cell operating to transform heat waves into compression waves, a light-reflecting element, an optical system including a plate having apertures arranged in the same geometrical pattern as said cell mosaic for projecting beams of light on said element respectively opposite said cells, said plate being so located that circles of light on said mosaic due to said apertures are approximately the same dimension as the individual cells in the mosaic, means actuated by the compression waves in the respective cells for varying the contour of said element according to the amplitude variations of the respective waves thereby to deflect the light beams reflected from said element, a second plate having apertures respectively registering with the reflected light beams, said apertures being arranged in the same geometrical pattern as said cell mosaic but proportionately greater in size, and a screen receiving the respective modulated light beams from said second plate to produce visibly an image informative of the object from which said heat waves emanate.

6. In a heat detecting system, a light-reflecting element, an optical system for projecting a plurality of light beams on said element, means for observing the respective beams reflected from said element, means including a plurality of units responsive to heat waves from an area under observation for varying the contour of said reflecting element as a function of the amplitude of said heat waves, said units being juxtaposed to an exposed face of said element, and means to modulate the respective reflected beams, whereby a visible image is produced informative of the object which is the source of heat in said area.

7. In a heat detecting system, a light-reflecting element, an optical system for projecting a plurality of light beams on said element, means for observing the respective beams reflected from said element, means including a plurality of units responsive to heat waves from an area under observation for differentially varying the contour of said reflecting element as a function of the amplitude of said heat waves, said units being juxtaposed to an exposed face of said element, and means to modulate the respective reflected beams, whereby a visible image is produced informative of the object which is the source of heat in said area.

WILLIAM A. TOLSON.

REFERENCES CITED

The following references are of record in the file of this patent:

UNITED STATES PATENTS

| Number | Name | Date |
| --- | --- | --- |
| 504,890 | Ohmart | Sept. 12, 1893 |
| 1,642,011 | Chubb | Sept. 13, 1927 |
| 1,936,514 | Lengnick | Nov. 21, 1933 |
| 2,031,884 | Gray | Feb. 25, 1936 |
| 2,115,578 | Hall | Apr. 26, 1938 |
| 2,155,471 | Cawley | Apr. 25, 1939 |
| 2,288,766 | Wolff | July 7, 1942 |
| 2,332,154 | Lindsay | Oct. 19, 1943 |
| 2,424,976 | Golay et al. | Aug. 5, 1947 |